UNITED STATES PATENT OFFICE.

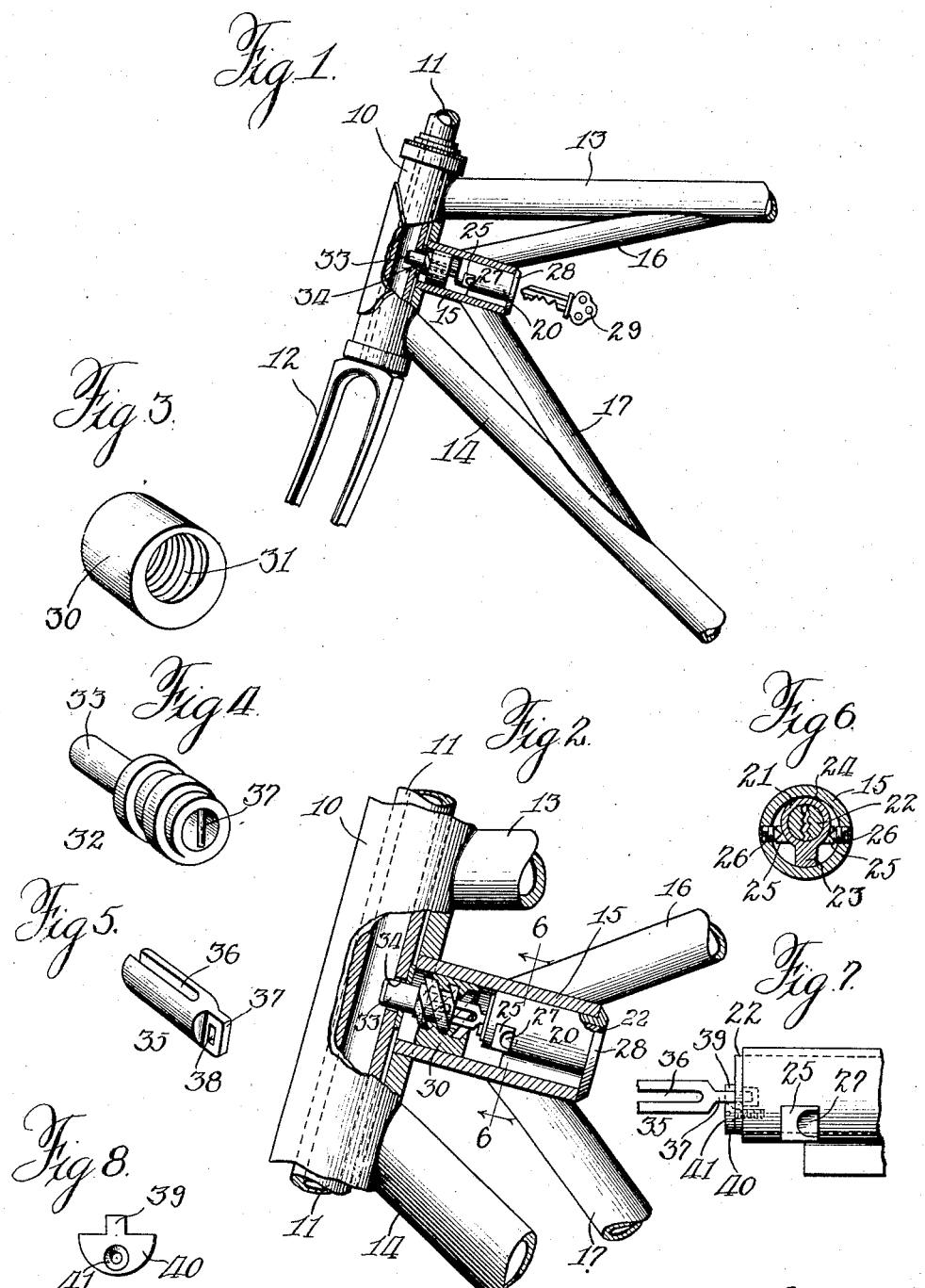

ISRAEL STEINBERG, OF CHICAGO, ILLINOIS.

FRAME AND LOCKING MEANS FOR BICYCLES.

1,408,652.      Specification of Letters Patent.      Patented Mar. 7, 1922.

Application filed February 2, 1921. Serial No. 441,720.

*To all whom it may concern:*

Be it known that I, ISRAEL STEINBERG, a citizen of the United States, residing in Chicago, Cook County, Illinois, have made certain new and useful Improvements Relating to Frames and Locking Means for Bicycles, and of which the following is a specification.

In the accompanying and hereto-relating drawings I have shown these improvements in connection with fragments which are to be understood as being parts of a bicycle having the well-known diamond frame.

One of the objects of my present invention is to strengthen the frame of such vehicles at the region where, in the great majority of instances, the breaks and ruptures in the frame occur from the shocks of service. Another object is to provide locking means for the steering post so arranged as to be out of the way, easily available for operation, which utilize a frame member, and, specifically, a novel form of reinforcing frame member, as a housing for the lock and bolt parts, thus avoiding the addition of a separate housing upon the steering post head and the various objections incident thereto. Another object is to provide locking means for adjacent parts which have motion relative to each other and which locking means are peculiarly effective in that the same may not be jarred, sprung, or "picked" open, or otherwise unlocked than with the proper hand-operable means.

Figure 1 of the drawings shows in side view the front end portions of a bicycle frame with these improvements applied thereto, the steering post head, steering post and the intermediate frame member being sectionally shown; Fig. 2 is an enlarged fragmentary view similar to that of Fig. 1; Fig. 3 is an enlarged perspective of the internally threaded member secured in the lock housing; Fig. 4 is a similar perspective of the exteriorly threaded member carrying the locking pin or bolt; Fig. 5 is a similar perspective of a connection member which communicates rotative motion from the lock to the threaded member of Fig. 4; Fig. 6 is a section on the line 6—6 of Fig. 2; Fig. 7 is a fragmentary side view of the lock showing the connection between the rotatable part of the lock and the member shown in Fig. 5; and Fig. 8 is a face view of the device for holding to the lock the end of the part shown in Fig. 7.

The steering-post head 10, the steering post 11 having the wheel fork 12, and the upper and lower main frame parts 13 and 14 rigid with the head 10 and extending rearward therefrom are all to be considered as parts of a bicycle of the ordinary diamond frame type.

Between the upper and lower frame parts I provide a strengthening and reinforcing intermediate frame part 15, also rigid with the head 10 and extending rearward therefrom. To secure the part 15 in position, the head is provided with a hole having the diameter of the tubular part 15 and this part is inserted in the hole and brazed rigidly to the head, forming a strong connection. Preferably the member 15 is relatively short, and substantially at its free end portion there are rigidly secured to it the bracing frame members 16 and 17 which are rigidly connected with the upper and lower main frame parts 13 and 14 respectively. The front end of the frame is thus strengthened and reinforced in a peculiarly effective and advantageous way. The added frame parts 15, 16 and 17 lie in the same normally vertical planes as do the main frame parts 13 and 14 and these parts are thus entirely out of the way and add nothing to the normal lateral proportions of the frame.

The intermediate frame part 15 is hollow, and is shown as a short section of tubing which may be considered as of the same kind of steel as is generally used for bicycle frames. The bracing frame parts 16 and 17 are also to be considered steel tubes.

The lock 20 is of well-known form and includes a circular casing part 21 (Fig. 6) in which is rotatably mounted the key-operated part 22, the rotation of which is controlled by tumblers (not shown) in the extension 23 of the lock body. The rotatable part 22 of the lock has a key-way 24 adapted to receive the key 29, the insertion of the key forcing the tumblers out of their locking position and enabling the part 22 to be rotated one way or the other by the operator holding the key. The lock body has a pair of oppositely disposed extensions 25, and 105 is held in the frame part or housing 15 by a pair of screws 26 engaging the recesses 27 respectively (Figs. 1, 2 and 7), thus holding the lock body from rotating and also from moving outward. The outer face plate 28 of the lock body, provided with a key-way (not shown) has a flange engaging the free end of the intermediate frame member 15 and this prevents the lock from extending farther inward than is desired. When the screws 26 are positioned as in Fig. 6 they are slightly below the surface of the casing 15, and the depressions there are filled up with cement or any other suitable substance so that when the part 15 is enameled over it will show no trace of the position of the screws.

A cylindrical nut member 30 is permanently secured, as by brazing, within the intermediate frame part 15. The hole 31 therethrough is sufficiently off center to bring its axis in line with the center of the rotatable part 22 of the lock. The hole 31 is screw-threaded to accommodate the wide-pitch threads of the bolt member 32 shown in Fig. 4. This bolt member has a bolt 33 adapted to project through the hole 34 in the steering post 11, which hole 34 is so positioned that when the bolt 33 is in it the fork 12 is turned well around out of its normally straight-forward position whereby an unauthorized person may not ride the bicycle away.

Means for rotating the bolt member 32 comprise a bifurcated connection member 35 well shown in Fig. 5, the same having a slot 36 adapted to receive slidably the cross-pin 37 in the bolt member 32 (Fig. 4). The connection member 35 has a flattened part 37 having a slot-like hole 38 adapted to receive the rectangular projection 39 (Fig. 7) of the retaining bolt 40, which is held by means of the screw 41 upon the rotatable part 22 of the lock.

From the construction shown and described it is clear that when the key 29 is inserted, releasing the tumblers of the lock, and is then turned, the rotative motion will be communicated to the bolt member 32 and that the same is thereby moved bodily toward and away from the steering post through its screw action and can be made to enter the hole 34 in the steering post and again be withdrawn therefrom.

A lock of the kind shown is peculiarly free from unauthorized interference in that the locking bolt is positively held against all movement but such as results from turning the rotative part of the lock, and this requires the proper hand-operable means, as for instance a key in the particular form of device shown. The construction as a whole is a notable improvement in bicycles of the type described in that the frame is greatly strengthened at its weakest locality by means which are attractive in appearance and which at the same time provide a housing for a lock in an out-of-the-way place, and, furthermore, it provides a lock housing which is so strongly secured as not to be suspectible of breakage for unauthorized manipulation of the lock.

Reference should be had to the appended claims to determine the scope of the improvements herein set forth.

I claim:

1. In a bicycle, a frame comprising a hollow steering post head, a steering post operably mounted in said head, an upper frame member and a lower frame member rigidly fused upon the head and extending rearward therefrom, an intermediate frame member extending rearward between the upper and lower frame members and also rigidly fused upon the head, a pair of bracing members rigidly fused upon the intermediate frame member substantially at the free end thereof and forming therewith substantially a Y-shaped structure, one member of said pair extending rearwardly and being rigidly fused upon the upper frame member, the other thereof extending rearwardly and being rigidly fused upon the lower frame member, and a hand-operable lock within the intermediate frame member, the lock having a bolt movable into and out of locking engagement with the steering post.

2. A bicycle frame comprising a hollow steering post head, an upper frame member and a lower frame member rigidly fused upon the head and extending rearward therefrom, an intermediate frame member extending rearward between the upper and lower frame members and also rigidly fused upon the head, a pair of bracing members rigidly fused upon the intermediate frame member substantially at the free end thereof and forming therewith substantially a Y-shaped structure, one member of said pair extending rearwardly and being rigidly fused upon the upper frame member, the other thereof extending rearwardly and being rigidly fused upon the lower frame member.

3. In a bicycle, a frame comprising a hollow steering post head, an upper frame member and a lower frame member rigidly fused upon the head and extending rearward therefrom, a lock housing rigidly fused upon the head and extending rearward therefrom between the upper and lower frame members, a bracing member extending from said lock housing to the upper frame member, a bracing member extending from the lock housing to the lower frame member, said bracing members being fused to the lock housing and to the upper and lower frame members respectively, a steering post operably mounted in the steering post head, and locking means in said lock housing for locking the steering post against its normal rocking movement.

4. In a bicycle, the combination of a steering post head, a steering post operably mounted therein, an upper frame member and a lower frame member, and a hollow intermediate frame member, each thereof being fused rigidly upon and extending rearward from the steering post head, the intermediate frame member being fused also to a frame part rearward of the head to constitute a part of the permanent frame structure, and a hand-operable lock within the intermediate frame member, the lock having a bolt movable into and out of locking engagement with the steering post.

ISRAEL STEINBERG.